US012603590B2

(12) United States Patent
Passeri et al.

(10) Patent No.: US 12,603,590 B2
(45) Date of Patent: Apr. 14, 2026

(54) METHODS AND SYSTEMS FOR SYNCHRONIZING SYNCHRONOUS MOTORS WITH ELECTRIC GRID BASED ON DETECTED SHAFT POSITION

(71) Applicant: NUOVO PIGNONE TECNOLOGIE SRL, Florence (IT)

(72) Inventors: Marco Passeri, Florence (IT); Michele Frattoni, Florence (IT); Riccardo Bagagli, Florence (IT); Simone Bassani, Florence (IT)

(73) Assignee: Nuovo Pignone Tecnologie SRL, Florence (IT)

( * ) Notice: Subject to any disclaimer, the term of this patent is extended or adjusted under 35 U.S.C. 154(b) by 234 days.

(21) Appl. No.: 18/254,995

(22) PCT Filed: Nov. 25, 2021

(86) PCT No.: PCT/EP2021/025461
§ 371 (c)(1),
(2) Date: May 30, 2023

(87) PCT Pub. No.: WO2022/117224
PCT Pub. Date: Jun. 9, 2022

(65) Prior Publication Data
US 2024/0007032 A1 Jan. 4, 2024

(30) Foreign Application Priority Data
Dec. 2, 2020 (IT) .......................... 102020000029387

(51) Int. Cl.
*H02P 6/04* (2016.01)
*H02P 6/21* (2016.01)

(52) U.S. Cl.
CPC . *H02P 6/21* (2016.02); *H02P 6/04* (2013.01)

(58) Field of Classification Search
CPC ................. H02P 6/21; H02P 6/04; H02P 1/52
See application file for complete search history.

(56) References Cited

U.S. PATENT DOCUMENTS

| | | | | |
|---|---|---|---|---|
| 5,481,166 A | * | 1/1996 | Moreira | ................. H02P 6/187 |
| | | | | 318/400.04 |
| 6,600,279 B2 | * | 7/2003 | Meyer | ...................... H02P 6/18 |
| | | | | 318/459 |
| 7,034,427 B2 | * | 4/2006 | Hirzel | ................... H02K 21/24 |
| | | | | 310/191 |

(Continued)

*Primary Examiner* — Rina I Duda
(74) *Attorney, Agent, or Firm* — Paul Frank + Collins P.C.

(57) ABSTRACT

The system (100) is used for starting and synchronizing synchronous motors (10) with power electricity of an electric grid (20). The system (100) includes a variable frequency driver (30) for starting the synchronous motors (10), and an electrical diverter (61, 63) for each synchronous motor (10). The electrical diverter (61, 63) has a control input electrically coupled to a control output of the variable frequency driver (30) so to selectively couple stator windings (12) of synchronous motors (10) with a power output (33) of the variable frequency driver (30) or with the electric grid (20) based on signals that are received at a control input of the variable frequency driver (30) and represent a position of the shafts of the synchronous motors (10). Therefore, switching occurs at desired shafts positions.

11 Claims, 6 Drawing Sheets

(56)                    References Cited

U.S. PATENT DOCUMENTS

| | | | |
|---|---|---|---|
| 7,528,559 B2 * | 5/2009 | Peters | H02P 29/032 |
| | | | 318/105 |
| 7,661,274 B2 * | 2/2010 | Crane | F25B 49/025 |
| | | | 318/803 |
| 7,948,193 B2 * | 5/2011 | Komatsu | H02P 25/024 |
| | | | 318/400.29 |
| 8,344,673 B2 * | 1/2013 | Rotondo | F04D 29/668 |
| | | | 318/434 |
| 2010/0084935 A1 * | 4/2010 | Jadric | H02P 6/085 |
| | | | 310/156.28 |
| 2011/0018485 A1 * | 1/2011 | Maeda | H02P 6/16 |
| | | | 318/721 |
| 2012/0306458 A1 * | 12/2012 | Fogarty | H02P 9/08 |
| | | | 322/32 |
| 2013/0334998 A1 * | 12/2013 | Osman | H02P 1/52 |
| | | | 318/503 |
| 2016/0254763 A1 | 9/2016 | Hong et al. | |
| 2017/0126164 A1 * | 5/2017 | Gibbs | H02J 9/06 |
| 2018/0142660 A1 | 5/2018 | Forster et al. | |

* cited by examiner

METHODS AND SYSTEMS FOR SYNCHRONIZING SYNCHRONOUS MOTORS WITH ELECTRIC GRID BASED ON DETECTED SHAFT POSITION

TECHNICAL FIELD

The subject-matter disclosed herein relates to methods for synchronizing synchronous motors with power electricity of an electric grid and to systems for starting and synchronizing synchronous motors with power electricity of an electric grid.

BACKGROUND ART

A synchronous motor has a plurality of poles, for example N poles associated to the stator and N poles associated to the rotor. When the motor rotates the rotor poles rotate synchronously with respect to the stator poles.

In order to start a synchronous motor, i.e. to change the speed of its rotor from zero to the rated motor speed, there is known using a so-called VFD (=Variable Frequency Driver). A VFD is an electric/electronic unit that drives the windings of the motor (specifically, general, both the stator windings and the excitation windings) till when the drive voltage amplitude and the drive voltage frequency is close to the rated voltage amplitude value and the rated voltage frequency value of the motor; to be precise, the VFD takes the motor to a situation when the drive voltage amplitude is equal to the rated voltage amplitude value of the motor and the drive voltage frequency is very close to rated voltage frequency value of the motor. Once such situation is reached the motor may be powered directly by an electric grid (and no longer by the VFD), provided the voltage frequency value and the voltage amplitude value of the electric grid correspond to the rated voltage amplitude value and the rated voltage frequency value of the motor; however, in order to avoid malfunctions and/or damages, a power switch from the VFD to the grid requires that at least another condition is met.

Therefore, such power switch should be performed only when a phase difference between power from the variable frequency driver and power from the electric grid is null (or practically null).

Existing VFDs perform the above-mentioned power switch as soon as any voltage alignment (i.e. amplitude, frequency and phase) condition is reached. As known, if a synchronous motor has N poles, there are N/2 distinct possible poles alignment conditions within a 360° rotation of the rotor, and, therefore, N/2 voltage alignment conditions. This means that once start-up of the motor is finished and a power switch occurs, it is not possible to know which is the rotor position of the rotating motor.

SUMMARY

The shaft of a synchronous motor is often mechanically coupled to the shaft of a machine, for example a reciprocating compressor. In this case, lack of knowledge of the rotor position corresponds to lack of knowledge of a machine position at any time from when the motor start-up phase began; the machine operating position may be for example the exact position of the piston inside the cylinder of a reciprocating compressor.

Therefore, it would be desirable to start a synchronous motor so that its rotor position is known, preferably precisely known, just after the start-up phase, i.e. when it begins been driven by power electricity of an electric grid.

According to a first aspect, the subject-matter disclosed herein relates to a method for synchronizing a synchronous motor with power electricity of an electric grid. A switch from the variable frequency driver to the electric grid is performed at a time when a rotor of the motor is at a predetermined angular position. In particular, the method comprises the steps of: A) starting the synchronous motor by supplying power to the synchronous motor through a variable frequency driver, B) repeatedly performing comparison of the voltage amplitude and voltage frequency supplied to the synchronous motor with the voltage amplitude and voltage frequency of the power electricity, and C) if comparison is positive and when phase difference is null, performing the switch at the above mentioned time.

According to a second aspect, the subject-matter disclosed herein relates to a system for starting and synchronizing synchronous motors with power electricity of an electric grid. The system includes an improved variable frequency driver for starting each of the motors by appropriately driving their stator windings and their excitation windings. The system includes further an electrical diverter for each motor that is driven by the improved variable frequency driver so to selectively couple stator windings of the motor with a power output of the variable frequency driver or with the electric grid based on signals received at a control input of the improved variable frequency driver. The system includes further an a switching enable unit having a control input and a control output; this control input is arranged to be electrically coupled to shaft angular position detectors of synchronous motors, while this control output is electrically coupled to the control input of the variable frequency driver; the switching enable unit is configured to enable power switching from the variable frequency driver to the electric grid.

According to a third aspect, the subject-matter disclosed herein relates to a fluid compression plant including synchronous motors and a compressor mechanically coupled to each of the motor. The plant includes further an improved system for starting and synchronizing each of the motors. The improved system is arranged to start the motors so that when all motors are powered by the same electric grid the driven compressors are at predetermined relative operating positions between each other.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

Figure 1:
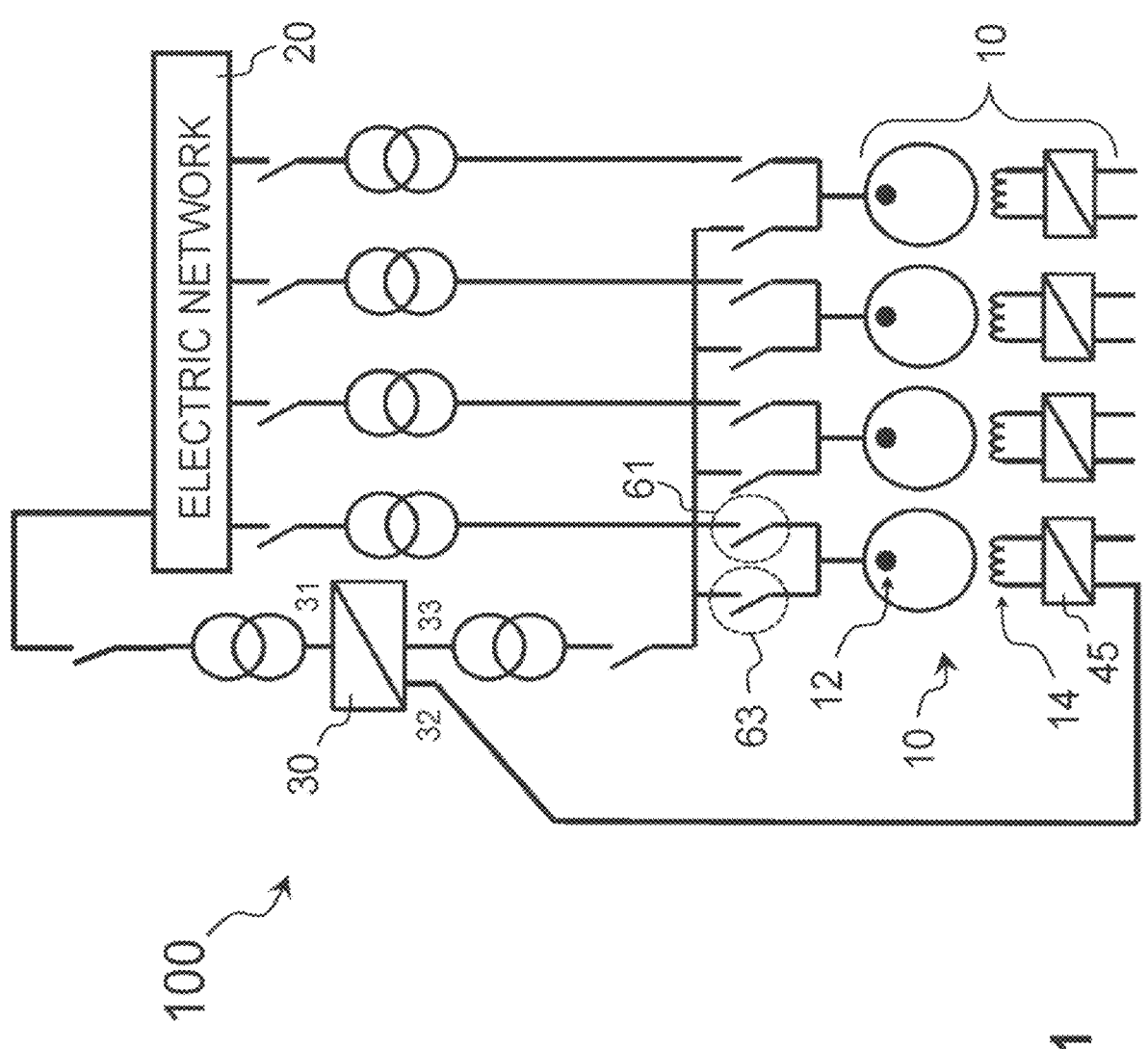
FIG. 1 shows a block diagram of an embodiment of an improved system for starting and synchronizing synchronous motors electrically connected to an electric grid and to a plurality of synchronous motors.

A variable frequency driver is able to start a synchronous motor. It provides the stator windings and the excitation windings of the motor with electricity. The voltage amplitude and the voltage frequency of the electricity are increased till when they are close to the rated voltage amplitude value and the rated voltage frequency value of the motor. Once this condition is met, the variable frequency driver is ready to perform a power switch, i.e. to connect the motor to an electric grid so that the motor receives electricity from the electric grid and no longer from the driver, when phase difference is null. According to the present inventive improvement, such power switch is not performed at any time, for example immediately after reaching the rated voltage amplitude value and the rated voltage frequency value, but when the shaft of the motor is at a predetermined position as indicated by e.g. an appropriate sensor or detector. In this way, any machine connected to the shaft of the motor and operated by the motor is synchronized with the electric grid as desired.

Reference now will be made to embodiments of the disclosure, an example of which is illustrated in the drawings. The example is provided by way of explanation of the disclosure, not limitation thereof. In fact, it will be apparent to those skilled in the art that various modifications and variations can be made in the present disclosure without departing from the scope or spirit of the disclosure.

Figure 2:
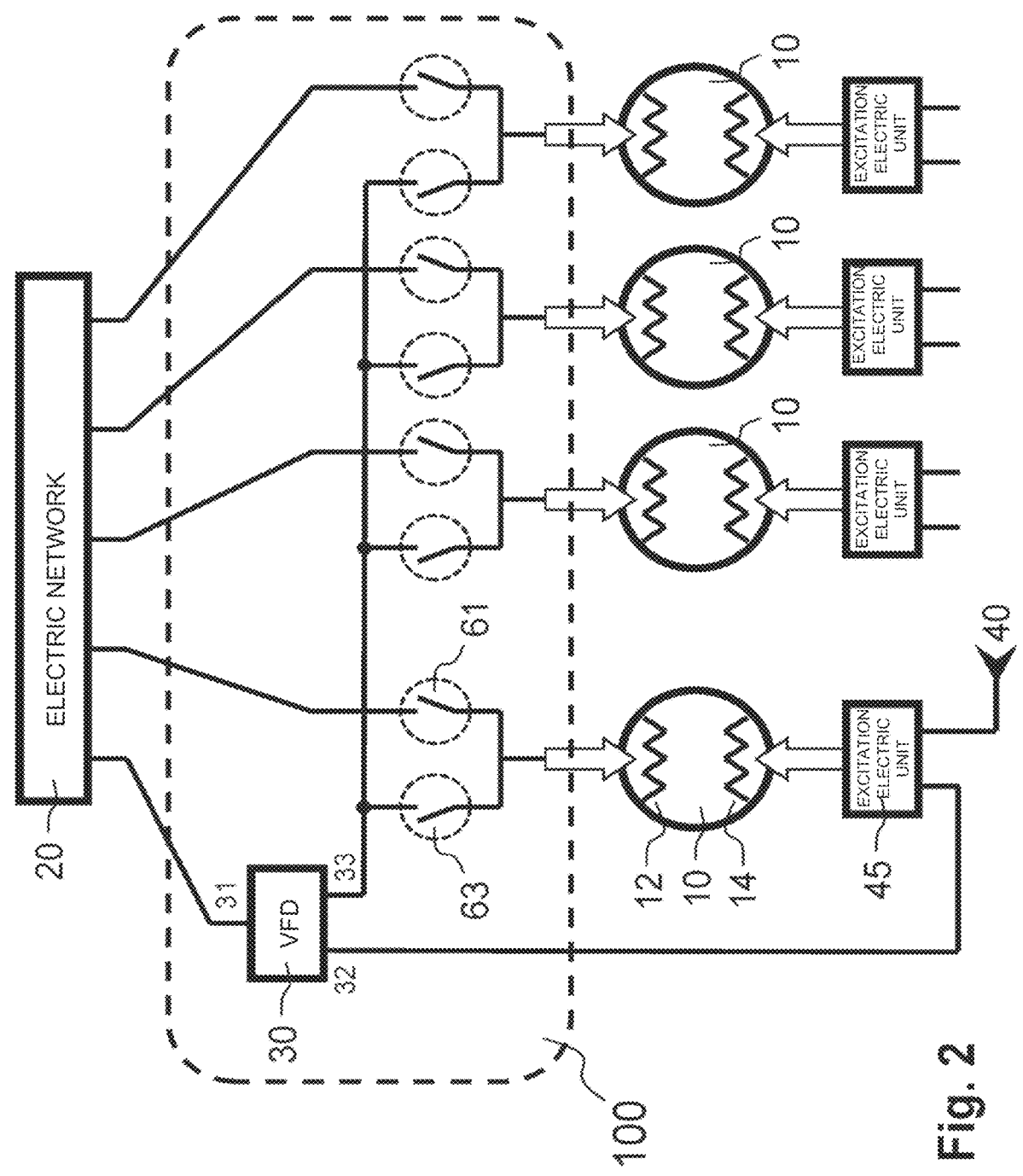
FIG. 2 shows a block diagram of an improved variable frequency driver electrically connected to some components of the system of FIG. 1 used for switching power to a synchronous motor.
Figure 3:
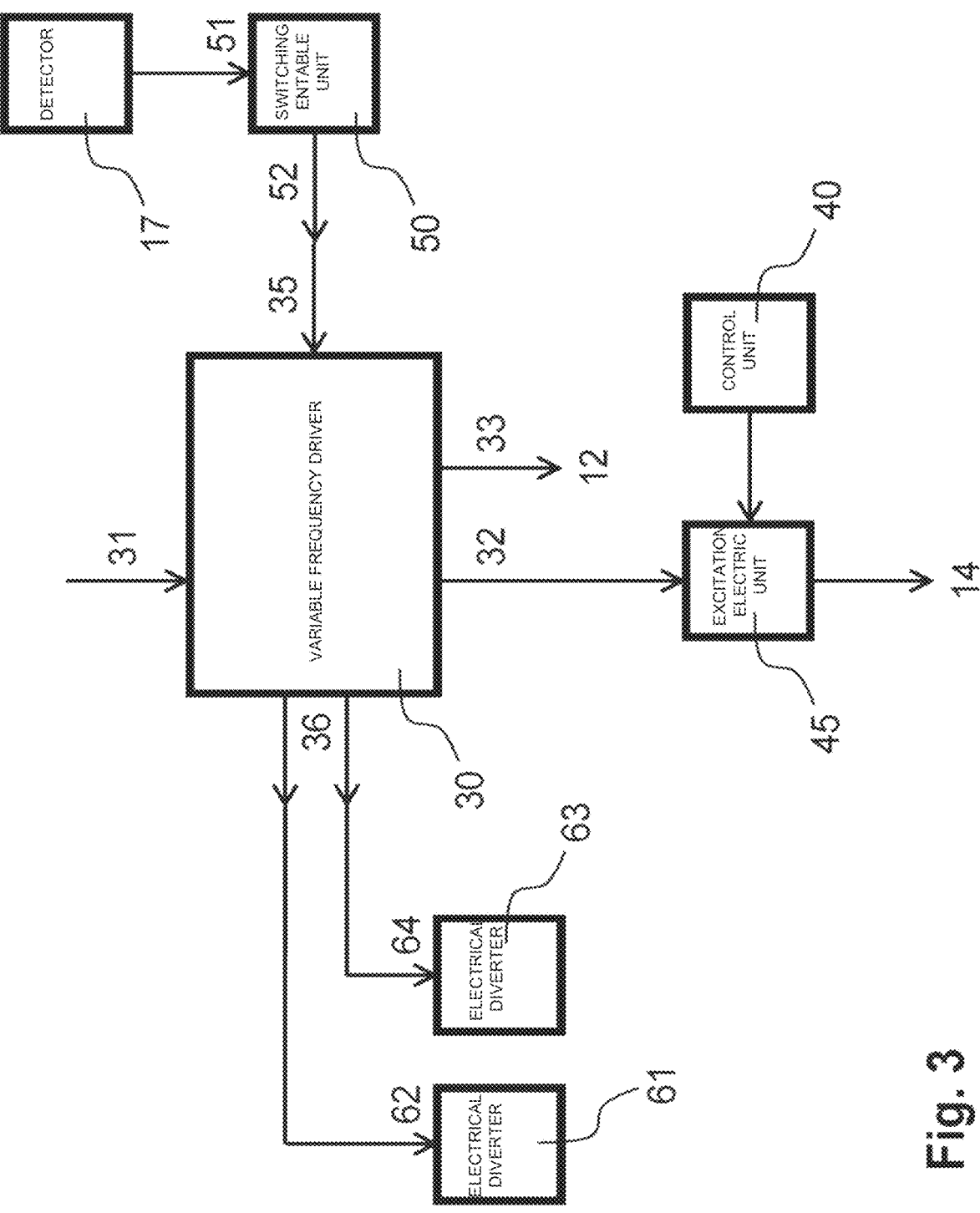
FIG. 3 shows a detailed block diagram of the improved variable frequency driver of FIG. 2.

FIG. 1 shows an embodiment of a starting and synchronizing system 100. System 100 is electrically coupled to an electric grid 20 and a plurality of synchronous motors 10; partial detailed views of this embodiment are shown in FIG. 2 and FIG. 3. According to this embodiment, four identical motors 10 are provided; however, system 100 may be used for starting and synchronizing any number of synchronous motors either identical or similar between each other (for example having the same pole pairs number). Electric grid 20 is a source of AC power electricity and is used for powering motors 10 both during start-up and during normal operation; electric grid powers a motor directly during normal operation and indirectly, i.e. through an electric driver, during start-up.

In FIG. 1, some components of motor 10 are highlighted and associated to reference numerals as they are useful for understanding the following disclosure, while other components are omitted. In particular, a motor 10 includes stator windings 12 (shown schematically as black circles), excitation windings 14 and an excitation electric unit 45 that is electrically connected to excitation windings 14 and that is arranged to generate electric power voltages and electric power currents suitable for the excitation windings of the synchronous motor. It is to be noted that the excitation electric unit is often considered part of the synchronous motor; however, it may also be a separate component.

Essentially, system 100 includes an improved variable frequency driver 30 and one or more electrical diverters (combination of elements 61 and 63); there should be an electrical diverter for each synchronous motor, as shown in FIG. 1, that operate in the same way and perform the same functions. An electrical diverter is an electric component that is designed to divert electricity between two electric paths;

according to the embodiment of FIG. 1, the electrical diverter includes two electrical switches associated to each other, i.e. a first electrical switch 61 and a second electrical switch 63.

The electrical diverter is arranged to selectively electrically couple stator windings of a synchronous motor with a power output of the variable frequency driver or with the electric grid. In particular, first electrical switch 61 is arranged to selectively couple stator windings 12 with electric grid 20 and second electrical switch 63 is arranged to selectively couple stator windings 12 with a power output 33 of variable frequency driver 30. Switches 61 and 63 may be arranged so that stator windings 12 of a synchronous motor 10 are electrically coupled to only one electricity source at the same time; according to a first alternative, switches 61 and 63 are arranged so that stator windings 12 are electrically coupled initially to driver 30, finally to grid 20, and for a short intermediate time interval to both electricity sources; according to a first alternative, switches 61 and 63 are arranged so that stator windings 12 are electrically coupled initially to driver 30, finally to grid 20, and for a short intermediate time interval to no electricity source.

Improved variable frequency driver 30 is electrically coupled to electric grid 20 in order to receive electric power from the grid and drive both the stator windings and the excitation windings of one synchronous motor at a time; electric power is input to terminal 31; the drive signals for the excitation windings are output from terminal 32 and the drive signals for the stator windings are output from terminal 33.

According to the embodiment of FIG. 1, terminal 33 correspond to a power output of improved variable frequency driver 30; in fact, for example, improved variable frequency driver 30 is able to generate directly electric power voltages and electric power currents suitable for the stator windings of a synchronous motor.

According to the embodiment of FIG. 1, terminal 32 correspond to an excitation output of variable frequency driver 30; in fact, for example, improved variable frequency driver 30 is not able to generate directly electric power voltages and electric power currents suitable for the excitation windings of a synchronous motor, but is electrically coupled to the excitation electric unit 45 of a synchronous motor used for generating directly electric power voltages and electric power currents suitable for the excitation windings of a synchronous motor. Such solution may be used if the synchronous motor has an own integrated or associated excitation electric unit. Alternatively, a variable frequency driver may be able to generate directly electric power voltages and electric power currents suitable for the excitation windings of a synchronous motor.

According to the embodiment of FIG. 1, excitation electric unit 45 of a synchronous motor is arranged to receive excitation signals from improved variable frequency driver 30 during start-up and from an external control unit 40 (see FIG. 2) during normal operation; in fact, it has two excitation inputs. Driver 30 and unit 40 may coordinate so to avoid sending excitation signals to unit 45 at the same time; alternatively, an electrical diverter (not shown in FIG. 1) may be used. Control unit 40 may be part of a machinery control unit, i.e. a control unit arranged to control not only synchronous motors 10.

Improved variable frequency driver 30 operates only during start-up of a synchronous motor 10. In particular, according to the embodiment of FIG. 1, variable frequency driver 30 may start a first motor 10, afterwards once the first motor 10 is powered directly by electric grid 20 it may start a second motor 10, afterwards once the second motor 10 is powered directly by electric grid 20 it may start a third motor 10, afterwards once the third motor 10 is powered directly by electric grid 20 it may start a fourth motor 10, and then once the fourth motor 10 is powered directly by electric grid 20 it may remain inactive; as already clarified, the number of motors to be started may be one or two or three or four or any higher number.

It is to be noted that in FIG. 1, for the sake of simplicity and clarity, only electric (power) connection between improved variable frequency driver 30 and one motor 10 are shown (namely the one on the left in the figure); similar connections exist with the other motors 10.

It is also to be noted that in FIG. 1 there are shown some electrical switches without reference numerals and some electrical transformers without reference numerals that are not strictly necessary for the embodiment shown and are according to the customary practice in the art.

As shown in FIG. 3, variable frequency driver 30 has other terminals, in particular one terminal 35 for a control input and terminals 36 for control outputs for synchronous motors 10; these terminals and their electric connections are not shown in FIG. 1 and FIG. 2 for the sake of simplicity and clarity; they are explained in the following with the aid of FIG. 3.

A control output provides switching signals to an electrical diverter associated to a motor 10; in other words, improved variable frequency driver 30 is arranged to determine whether stator windings 12 of a synchronous motor 10 receives power from power output 33 of the variable frequency driver 30 or from electric grid 20, and to perform power switching between them, specifically power switching from the variable frequency driver to the electric grid. It is to be noted that the same control output may be used for several motors 10; for example, during a first time period it may be used for a first motor, during a second time period following the first time period it may be used for a second motor, and so on. In FIG. 3, two terminals 36 are shown as electrically coupled respectively to a control input 62 of first electrical switch 61 and a control input 64 of second electrical switch 63; according to alternative embodiments, a single terminal 36 may be sufficient if the control signal for switch 61 is exactly opposite to the control signal for switch 63.

The control input 35 receives switching enable signals from a switching enable unit; in other words, improved variable frequency driver 30 is arranged to perform power switching only if it is enabled (or authorized) from an external unit. It is to be noted that, according to some embodiment, the switching enable unit may be integrated into an inventive variable frequency driver.

As shown in FIG. 3, system 100 includes a switching enable unit 50 having a control input 51 and a control output 52. Control output 52 is electrically coupled to control input 35 of improved variable frequency driver 30. Control input 51 is electrically coupled to a detector 17; this detector is arranged to detect an angular position of a synchronous motor 10, preferably only one predetermined angular position. As it will be explained better in the following, unit 50 generates switching enable signals based on angular position of the shaft of the motor driven by improved variable frequency driver 30; in other words, power switching occurs only when the shaft of the motor is at a predetermined position. Detector 17 may be part of a measuring station arranged to detect not only a specific angular position, but also for example the rotation speed of the motor.

As already explained, prior-art variable frequency drivers perform power switching as soon as any voltage alignment condition of the starting synchronous motor is reached.

On the contrary, inventive variable frequency driver, such as variable frequency driver 30, performs power switching taking into account a further condition based on the angular position of the motor shaft. The control logic internal to the improved variable frequency driver 30 may be equated to a AND logic port having four logic inputs, one for each condition to be met, namely phase difference being null or very small (condition determined by circuitry internal to the driver), voltage amplitude difference being null or very small (condition determined by circuitry internal to the driver), voltage frequency difference being below a predetermined threshold (condition determined by circuitry internal to the driver), and switching being enabled (condition input to the driver); these conditions will be better explained afterwards.

Inventive variable frequency driver 30 may be implemented, for example, essentially through a combination of a static frequency converter model e.g. type "LCI Megadrive" of ABB and an excitation system model e.g. type "UNITROL 1020" of ABB. Such excitation system is able, inter alia, to drive such static frequency converter so to perform voltage-matching prior to synchronization. The drive signal from such excitation system may be combined with another signal from a control output (e.g. terminal 52 in FIG. 3) of a switching enable unit (e.g. unit 50 in FIG. 3) so that such static frequency converter is driven taking into account not only voltage matching but also rotor position.

Figure 4:
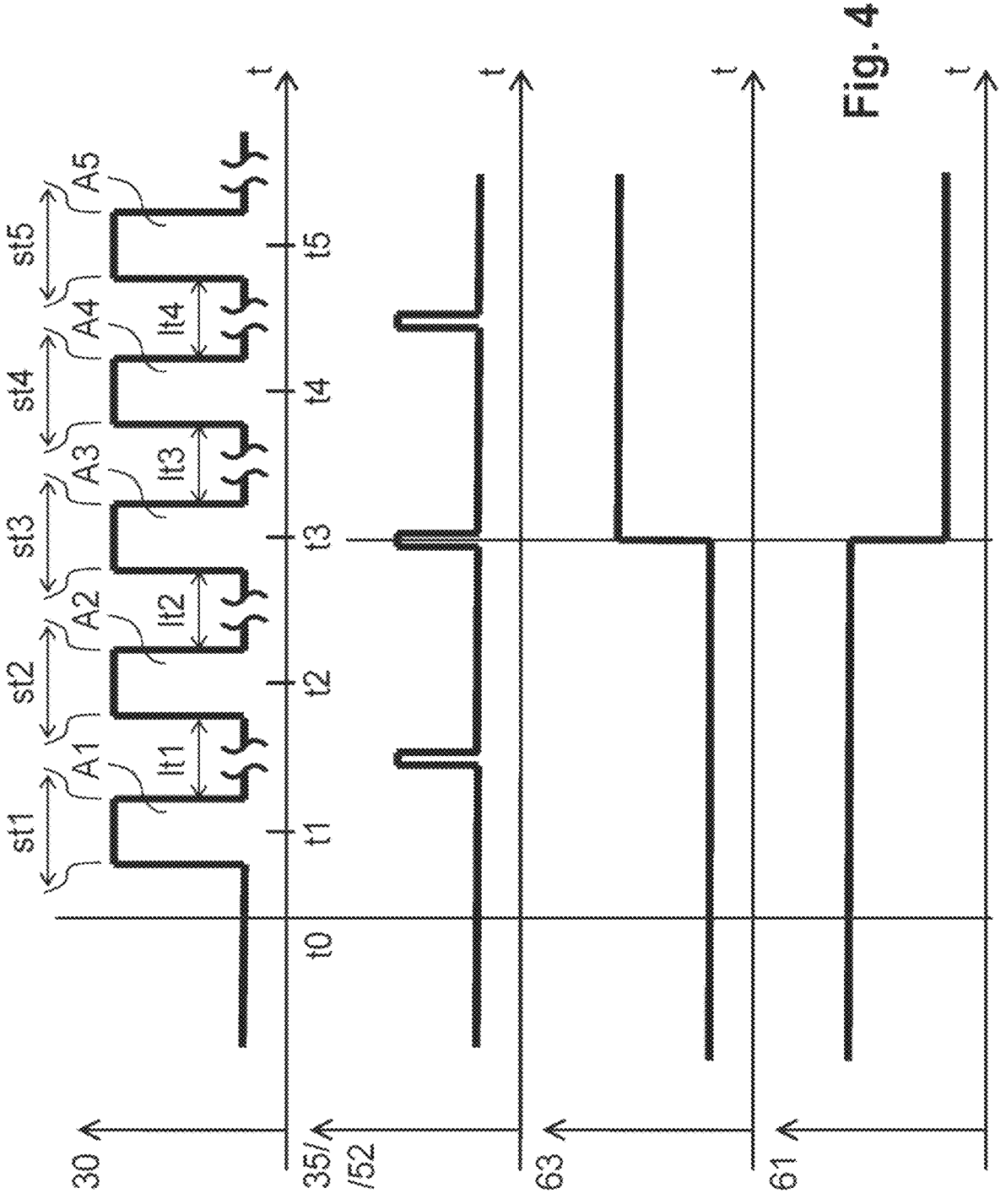
FIG. 4 shows time diagrams of electrical signals in the system of FIG. 1 relating to a power switch of a synchronous motor.

Considering for example FIG. 4, it is assumed that at time t0 (and at any later time) a sinusoidal signal driving first motor 10 is such that the drive voltage amplitude at power output 33 of variable frequency driver 30 is equal to the voltage amplitude of a sinusoidal signal of grid 20 and that the drive voltage frequency at power output 33 of variable frequency driver 30 is very close to the voltage frequency value of the sinusoidal signal of grid 20 (for example the frequency difference may be 0.1-0.2 Hz); such condition is reached thanks to the operation of variable frequency driver 30. At time t1, the electrical phase difference between the sinusoidal driving signal and the sinusoidal grid signal is zero; in a short time interval st1 around time t1, the phase difference is approximately zero and synchronization is possible. In this condition A1 it may be assumed for example a "rotor position" of roughly 0° (i.e. a first rotor condition with respect to an arbitrary reference). At time t2, the electrical phase difference between the sinusoidal driving signal and the sinusoidal grid signal is again zero; in a short time interval st2 around time t2, the phase difference is approximately zero and again synchronization is possible. In this condition A2 it may be assumed for example a "rotor position" of roughly PHI (corresponding to 360° divided by the number of pole pairs of the motor) (i.e. a second rotor condition with respect to an arbitrary reference). At time t3, the electrical phase difference between the sinusoidal driving signal and the sinusoidal grid signal is again zero; in a short time interval st3 around time t3, the phase difference is approximately zero and again synchronization is possible. In this condition A3 it may be assumed for example a "rotor position" of roughly 2*PHI (i.e. a third rotor condition with respect to an arbitrary reference). At time t4, the electrical phase difference between the sinusoidal driving signal and the sinusoidal grid signal is again zero; in a short time interval st4 around time t4, the phase difference is approximately zero and again synchronization is possible. In this condition A4 it may be assumed for example a "rotor position" of roughly 3*PHI (i.e. a fourth rotor condition with respect to an arbitrary reference). At time t5, the phase difference between the sinusoidal driving signal and the sinusoidal grid signal is again zero; in a short time interval st5 around time t5, the phase difference is approximately zero and again synchronization is possible. In this condition A5 it may be assumed for example a "rotor position" of roughly 4*PHI (i.e. a fifth rotor condition with respect to an arbitrary reference). The above-mentioned short time intervals st1, st2, st3, st4, st5 may be equal to for example one or two or three periods of the grid sinusoidal signal or in the range from e.g. 50 ms to 300 ms. Within long time intervals lt1, lt2, lt3, lt4 respectively between t1 and t2, t2 and t3, t3 and t4, t4 and t5, the phase difference is not zero and synchronization is not possible; the length of such long time intervals lt1, lt2, lt3, lt4 might be in the range from e.g. 2 s to e.g. 10 s. Switching enable unit 50 chooses what is the desired "rotor position" for the first motor 10, (according to the example of FIG. 4, it is equal to a mechanical phase shift of 2*PHI), and generates a switching enable signal that is transmitted at control output 52 of unit 50 (see corresponding time diagram in FIG. 4) and that is received at control input 35 of driver 30. As can be seen in FIG. 4, the switching enable signal has a short pulse each time the "rotor position" corresponds exactly to a mechanical phase shift of e.g. 2*PHI; switching must occur at one of these pulses but only if synchronization is possible (during time interval st3 in this case). Switching enable unit 50 determines the "rotor position" based on a signal received at its control input 51 from detector 17. Detector 17 may generate a short pulse each time the "rotor position" corresponds exactly to the arbitrary reference.

Figure 5:
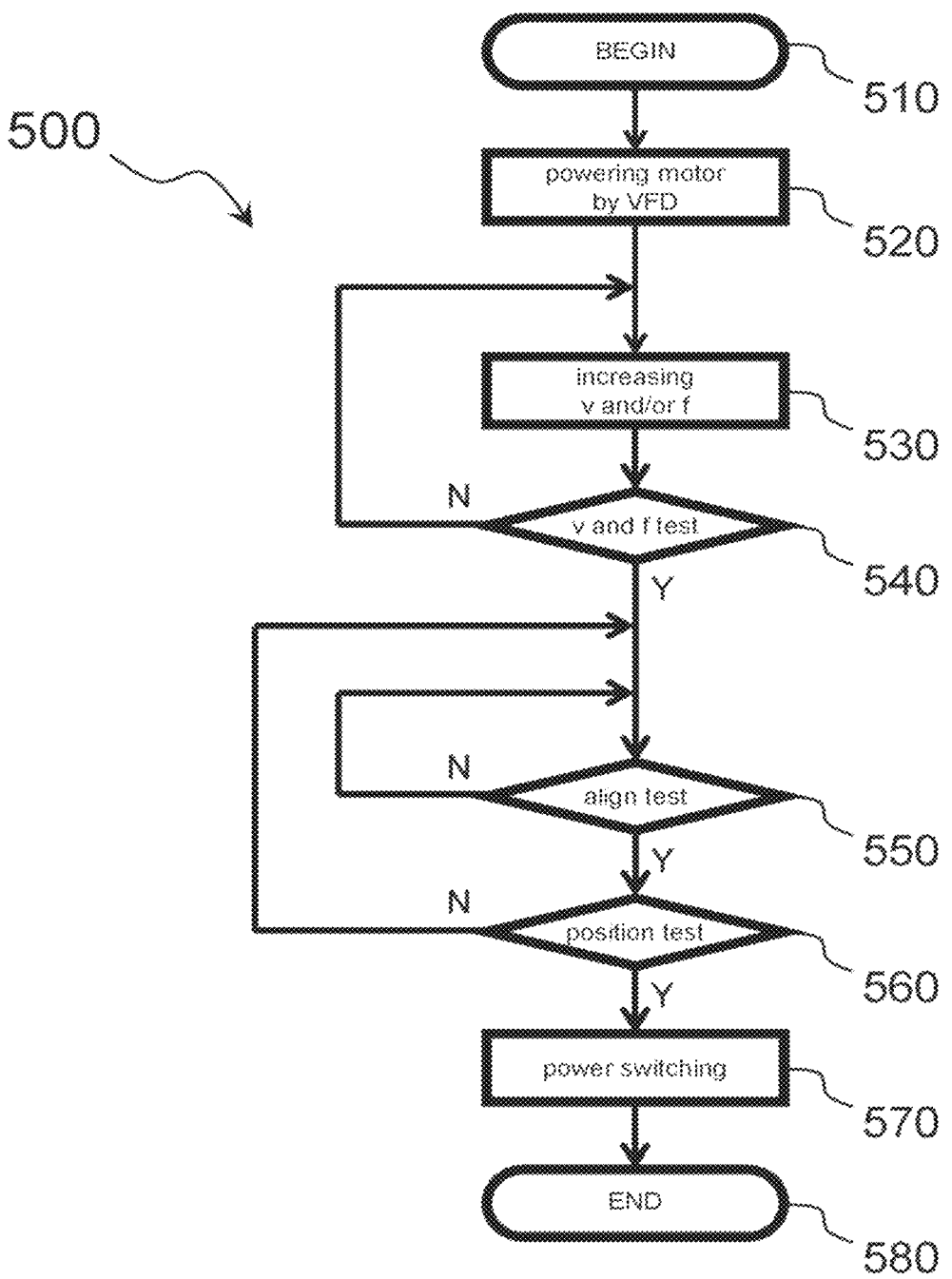
FIG. 5 shows a flowchart of an embodiment of a method for synchronizing synchronous motors with power electricity of an electric grid.

FIG. 5 shows a flowchart 500 of a specific embodiment of a method for synchronizing a synchronous motor with power electricity of an electric grid such as one of motors 10 in FIG. 1. Specifically, this flowchart relates to a start-up phase; block 510 corresponds to the begin of the phase and block 580 corresponds to the end of the phase. At block 520, a synchronous motor is powered by a variable frequency driver so that the motor starts rotating. At block 530, the drive voltage frequency and/or the drive voltage amplitude is a bit increased by variable frequency driver. At block 540, the drive voltage frequency and the drive voltage amplitude is compared with the motor rated voltage frequency and the motor rated voltage amplitude; if the difference is null or small, control moves forward to block 550; otherwise, control moves backward to block 540. At block 550, a voltage alignment condition (amplitude, frequency and phase) is tested; if there is such condition, control moves forward to block 560; otherwise, control loops back and after some time test 550 is repeated. At block 560, a shaft angular position (deriving from e.g. an angular position detector) is tested; if the shaft angular position is a desired one, control moves forward to block 570; otherwise, control loops back and after some time test 550 is repeated. At block 570, a power switch is performed so that the motor is powered by the electric grid and no longer by the variable frequency drive.

The above procedure may be repeated, for example, for all motors 10 in FIG. 1. In this case, the desired shaft angular positions of the motors may be different. Alternatively, the desired shaft angular positions of the motors may be the same.

In general, a method for synchronizing a synchronous motor with power electricity of an electric grid comprises the steps of:

A) starting the synchronous motor by supplying power to the synchronous motor through a variable frequency driver, so that a voltage amplitude supplied to the synchronous motor is raised toward a rated voltage amplitude of the synchronous motor and a voltage frequency supplied to the synchronous motor is raised toward a rated voltage frequency of the synchronous motor, B) repeatedly performing a comparison of the voltage amplitude supplied to the synchronous motor with the voltage amplitude of the power electricity, and a comparison of the voltage frequency supplied to the synchronous motor with the voltage frequency of the power electricity, and C) if the comparison is positive, performing a power switch by stopping supplying power to the synchronous motor through the variable frequency driver, and by starting supplying power to the synchronous motor from the electric grid.

At step C, the comparison is positive if the supplied voltage amplitude is equal or approximately equal (for example, less than about 3%) to the rated voltage amplitude or to the grid voltage amplitude, and the supplied voltage frequency is close to (for example, less than about 0.5% or about 0.1-0.2 Hz) to the rated voltage frequency or the grid voltage frequency; it is assumed that the rated voltage amplitude corresponds to the grid voltage amplitude and that the rated voltage frequency corresponds to the grid voltage frequency. Thanks to the small difference between the supplied voltage frequency and the grid voltage frequency, the motor slowly changes its synchronization status with respect to the grid, and one can choose exactly when to synchronize (consider for example FIG. 4 and its explanation), i.e. when the phase difference between power from the variable frequency driver and power from the electric grid is null or practically null (for example, less than about 2°).

Furthermore, according to such method, power switch is performed when a rotor of the synchronous motor is at a predetermined angular position. The predetermined angular position may be considered to correspond to a predetermined synchronization status of the motor with respect to the electric grid.

The predetermined angular position when to perform power switch may be selected from a set of predetermined angular positions.

The predetermined angular position may be selected by an operator for example when installing the motor or at a maintenance operation. In this case, referring to FIG. 1 and FIG. 2, one can assume that improved variable frequency driver 30 is arranged to receive (directly or indirectly) input from an operator. In this case, the predetermined angular position for a motor remains the same for a long time (for example, one year or even more).

Alternatively, the predetermined angular position may be selected based on input from an electronic control unit. In this case, referring to FIG. 1 and FIG. 2, one can assume that improved variable frequency driver 30 is arranged to receive input from an electronic control unit. In this case, the predetermined angular position for a motor may change rather frequently (for example, one week or one day or even less) and/or at any time.

It is to be noted that a change to the above-mentioned predetermined angular position does not have an immediate effect on the operation of the motor and its synchronization status with respect to the electric grid. In fact, such position is used when power switching occurs; after power switching, i.e. once the motor is powered directly by the electric grid (i.e. with reference to the example of FIG. 1, switch 63 is opened and switch 61 is closed), any change to such position will take effect only at the next synchronization of the motor with the electric grid.

As already explained, according to the present disclosure, power switching at step C may be performed only at certain conditions (consider for example blocks 550 and 560 in FIG. 5 and their explanation); one of the condition is a shaft angular position condition. In order to check such condition (consider for example block 560 in FIG. 5 and its explanation), a step D may be performed consisting in detecting angular position of the synchronous motor during rotation of the synchronous motor; based on the detected angular position, a power switch may be decided. Power switch may be performed based also on a time lapse starting from the detected angular position. It is to be noted that although letter "D" follows letters "A", "B" and "C", detection of angular position of the motor shaft may be carried out not only at any voltage alignment time or after the motor is fully rotating, but may be started when the motor starts rotating and continued afterwards.

At least step A, step B and step C and possibly step D may carried for at least another synchronous motor after completion of step C for a first synchronous motor. This means synchronizing a set of synchronous motors to the same electric grid.

Figure 6:
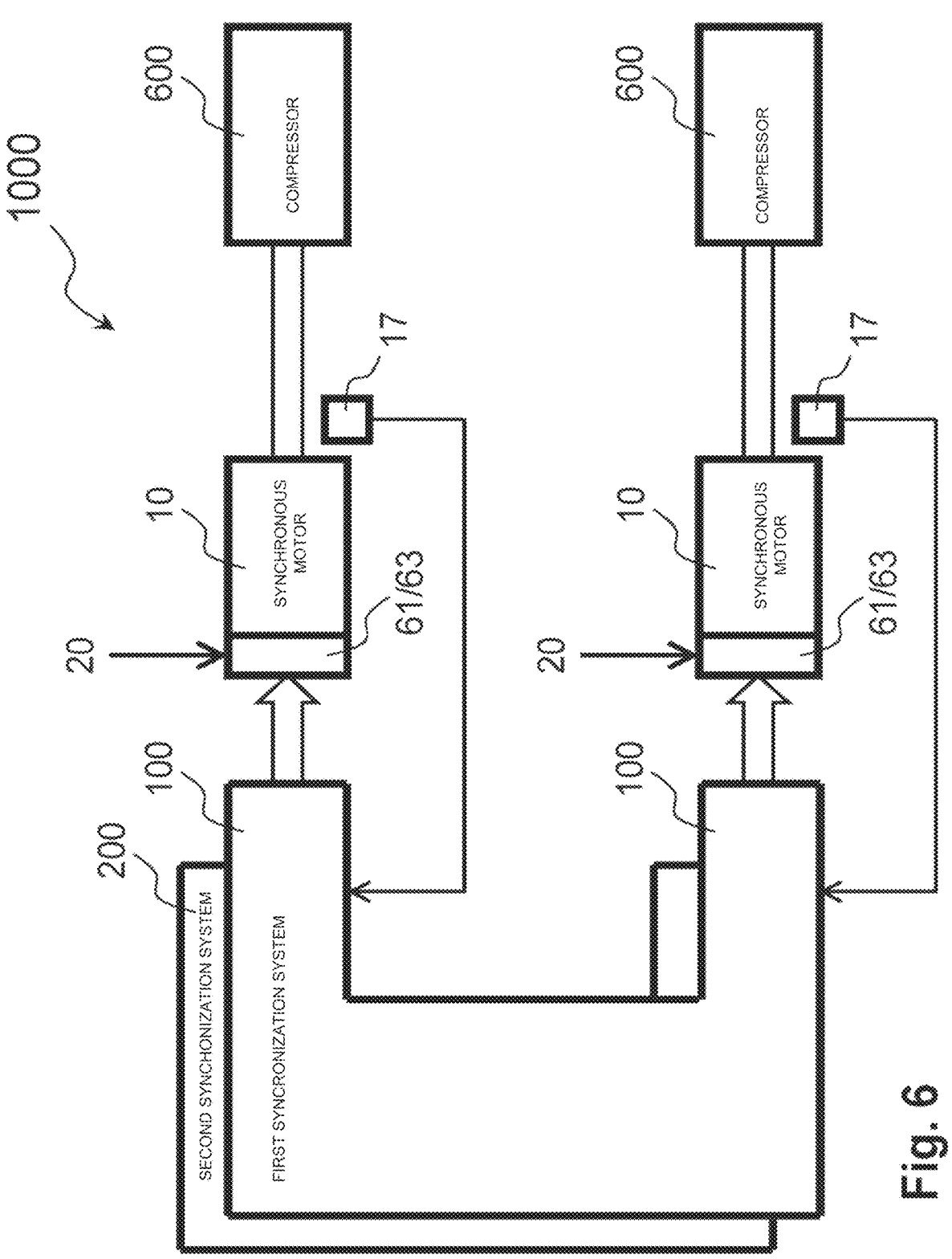
FIG. 6 shows a general block diagram of an embodiment of a fluid compression plant.

An advantageous application of the above described system and/or the above described method is in fluid compression plants, for example plant 1000 in FIG. 6.

In FIG. 6, by way of example, two synchronous motors 10 are shown having their shafts mechanically coupled respectively to two compressors 600. However, any number of motors and/or any number of compressors is possible. Furthermore, motors and compressors are not necessarily identical. Such solution is particularly effective if these compressors are reciprocating compressors as in a reciprocating compressor the angular position of its shaft corresponds to a longitudinal position of its piston and to a pressure in its compression chamber.

In the embodiment of FIG. 6, there is a shaft angular position detector 17 for each synchronous motors 10; each angular position detector 17 is electrically coupled to a same switching enable unit (see for example block 50 in FIG. 2) of the synchronization system 100 that may be called "main" synchronization system.

System 100 allows to appropriately synchronize compressors to the electric grid as well as between them. For example, considering the case of four synchronous motors and corresponding four reciprocating compressors (see e.g. FIG. 1), during normal operation, at a certain time the first compressor may be at about 0 compression and the second compressor may be at about 33% of its maximum compression and the third compressor may be at about 66% of its maximum compression and the fourth compressor may be at maximum compression; at a certain following time the first compressor may be at about 33% of its maximum compression and the second compressor may be at about 66% of its maximum compression and the third compressor may be at maximum compression and the fourth compressor may be at about 33% of its maximum compression; and so on.

In FIG. 6, a compressor shaft may be mechanically coupled to a synchronous motor shaft through a mechanical coupler (not shown in the figure). In particular, the mechanical coupler may be arranged to couple the shafts in a plurality of different positions, each different position corresponding to a different rotation angle between shafts. In this way, synchronization of compressors to the electric grid and between them may be determined not only through the synchronization system 100 but also manually.

It is to be noted the improved variable frequency driver of the synchronization system may be arranged to selectively disregard switching enable signals from its control input. This feature may be useful for example during maintenance, or if the synchronization system is not operating correctly or if during certain operating conditions synchronization is achieved in a different way, for example only through mechanical means.

In the embodiment of FIG. 6, in addition to synchronization system 100, there is a second synchronization system 200 identical or almost identical to system 100. System 200 is arranged to act as a backup synchronization system in case system 100 is defective or inactive.

The invention claimed is:

1. A method for synchronizing a synchronous motor with power electricity of an electric grid, the synchronous motor comprising a rotor and a stator with synchronously rotating pole pairs, the method comprising:

starting the synchronous motor by supplying power to the synchronous motor through a variable frequency driver so that a voltage amplitude supplied to the synchronous motor is raised toward a rated voltage amplitude of the synchronous motor and a voltage frequency supplied to the synchronous motor is raised toward a rated voltage frequency of the synchronous motor;

repeatedly performing, determining a voltage amplitude difference between the voltage amplitude of power supplied to the synchronous motor by the variable frequency drive and the voltage amplitude of power supplied by the electrical grid, and determining a voltage frequency difference between the voltage frequency of power supplied to the synchronous motor by the variable frequency drive and with the voltage frequency of power supplied by the electrical grid;

performing a power switch by:

stopping supply of power to the synchronous motor through the variable frequency driver, and starting supply of power to the synchronous motor from the electric grid, wherein the power switch is performed if at least the following conditions are met, a phase difference between power from the variable frequency driver and power from the electric grid is null, the voltage amplitude difference is null, the voltage frequence difference is below a pre-determined threshold, and the rotor of the synchronous motor has an angular position of twice an angular distance between adjacent pole pairs.

2. The method of claim 1, further comprising:

detecting the angular position of the synchronous motor during rotation of the synchronous motor.

3. The method of claim 1, wherein the power switch is performed in response to a time lapse starting from the angular position.

4. A system arranged to start up and synchronize synchronous motors with power electricity of an electric grid, the synchronous motors comprising a rotor and a stator with synchronously rotating pole pairs, the system comprising:

a variable frequency driver comprising:

a power input arranged to be electrically coupled to the electric grid, a excitation output arranged to be electrically coupled to excitation windings of synchronous motors, a power output arranged to be electrically coupled to stator windings of synchronous motors, a control input arranged to input switching enable signals, and a control output arranged to output switching signals, wherein the variable frequency driver is arranged to start the synchronous motors;

an electrical diverter for each of the synchronous motors, the electrical diverter comprising a control input coupled to the control output of the variable frequency driver;

a switching enable unit comprising a control input and a control output, wherein the control input of the switching enable unit is arranged to be electrically coupled to shaft angular position detectors of synchronous motors, wherein the control output of the switching enable unit is electrically coupled to the control input of the variable frequency driver, wherein the switching enable unit is configured to enable power switching from the variable frequency driver to the electric grid, wherein the electrical diverter is configured to selectively couple stator windings of synchronous motors with the power output of the variable frequency driver or with the electric grid by, starting the synchronous motor by supplying power to the synchronous motor through a variable frequency driver so that a voltage amplitude supplied to the synchronous motor is raised toward a rated voltage amplitude of the synchronous motor and a voltage frequency supplied to the synchronous motor is raised toward a rated voltage frequency of the synchronous motor;

repeatedly performing, determining a voltage amplitude difference between the voltage amplitude of power supplied to the synchronous motor and with the voltage amplitude of power supplied by the electrical grid, and determining a voltage frequency difference between the voltage frequency of power supplied to the synchronous motor and with the voltage frequency of power supplied by the electrical grid;

if performing a power switch by:

stopping supply of power to the synchronous motor through the variable frequency driver, and starting supply of power to the synchronous motor from the electric grid, wherein the power switch is performed if at least the following conditions are met, a phase difference between power from the variable frequency driver and power from the electric grid is null, the voltage amplitude difference is null, the voltage frequency difference is below a pre-determined threshold, and the rotor of the synchronous motor has an angular position of twice an angular distance between adjacent pole pairs.

5. The system of claim 4, wherein the electrical diverter comprises:

a first electrical switch arranged to be electrically coupled to the electric grid, and a second electrical switch electrically coupled to the power output of the variable frequency driver.

6. The system of claim 4, further comprising:

an excitation electric unit electrically coupled between the excitation output of the variable frequency driver and excitation windings of synchronous motors.

7. The system of claim 4, further comprising:

an excitation electric unit electrically coupled between the excitation output of the variable frequency driver and excitation windings of synchronous motors, wherein the excitation electric unit is arranged to be electrically coupled to a control unit, the control unit being arranged to control at least synchronous motors.

8. The system of claim 4, wherein said the variable frequency driver is arranged to selectively disregard switching enable signals from the control input.

9. A fluid compression plant, comprising:

synchronous motors comprising a rotor and a stator, the rotor and the stator comprising pole pairs that rotate synchronously during operation;

compressors coupled with the synchronous motors; and a system arranged to start up and synchronize the synchronous motors with power from an electric grid, the system having a variable frequency drive and a control structure configured to switch power between the variable frequency drive and the electrical grid in response to at least the following conditions, a phase difference between power from the variable frequency driver and power from the electric grid is null, a voltage amplitude difference between the voltage amplitude of power supplied to the synchronous motor by the variable frequency drive and the voltage amplitude of power supplied by the electrical grid is null, a voltage frequency difference between the voltage frequency of power supplied to the synchronous motor by the variable frequency drive and the voltage frequency of power supplied by the electrical grid is below a pre-determined threshold that is below a pre-determined threshold, and an angular position of the rotor of the synchronous motors that is twice an angular distance between adjacent pole pairs.

10. The fluid compression plant of claim 9, further comprising:

a shaft angular position detector for each of the synchronous motors, wherein each angular position detector is electrically coupled to a switching enable unit of the system.

11. The fluid compression plant of claim 9, further comprising:

mechanical couplers coupling a rotary shaft of the synchronous motors with a rotary shaft of the compressors in a plurality of different positions, each different position corresponding to a different rotation angle between the rotary shafts.

\* \* \* \* \*